Feb. 19, 1963 — T. A. BANK — 3,078,085
VEHICLE SUSPENSION
Filed Feb. 11, 1957 — 3 Sheets-Sheet 1

INVENTOR.
THOMAS A. BANK
BY W. A. Fraser
ATTY.

Feb. 19, 1963 T. A. BANK 3,078,085
VEHICLE SUSPENSION
Filed Feb. 11, 1957 3 Sheets-Sheet 2

*INVENTOR.*
THOMAS A. BANK
BY *W. A. Fraser*
ATTY.

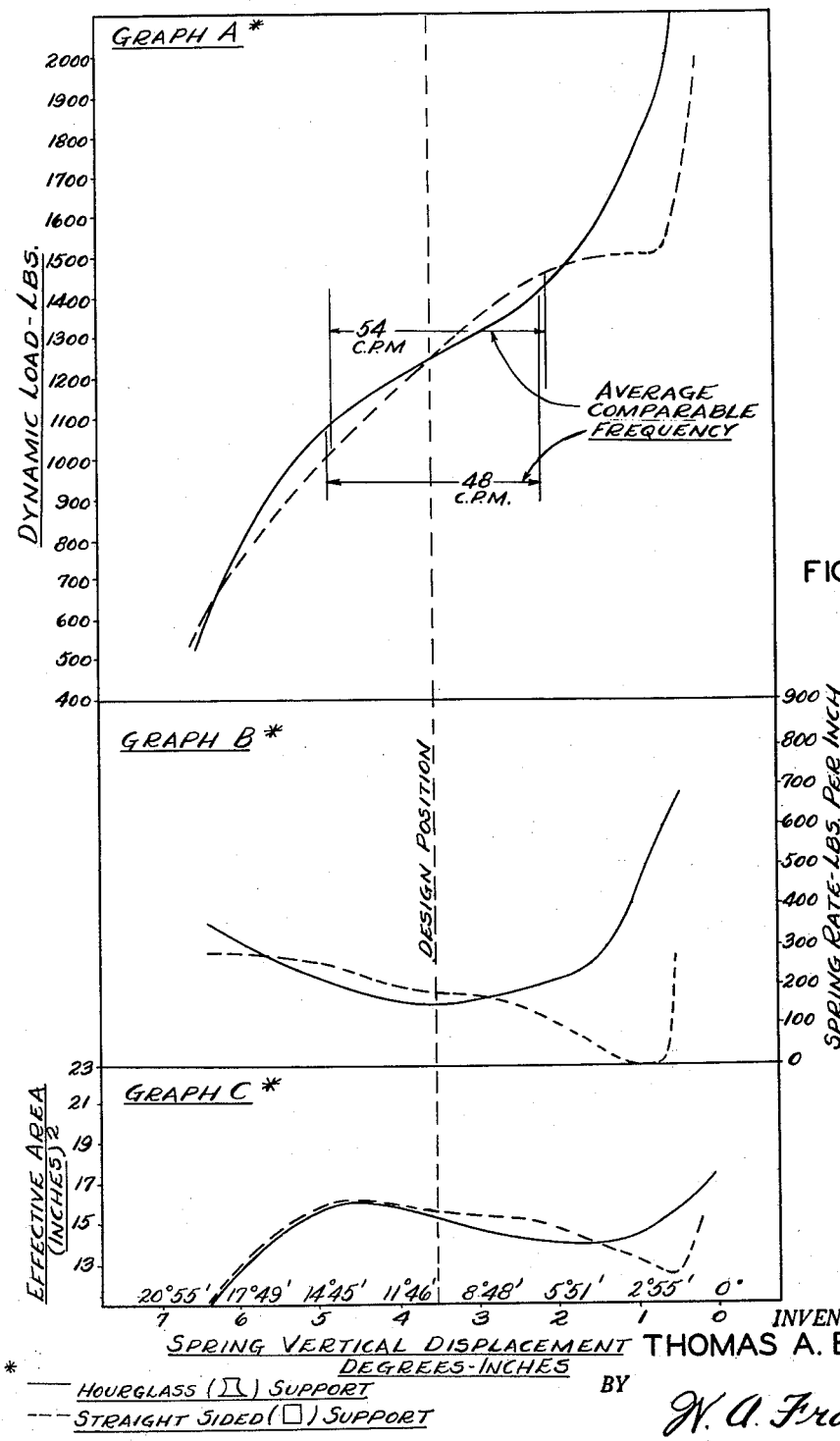

United States Patent Office 3,078,085
Patented Feb. 19, 1963

3,078,085
VEHICLE SUSPENSION
Thomas A. Bank, Indianapolis, Ind., assignor to The Firestone Tire & Rubber Company, Akron, Ohio, a corporation of Ohio
Filed Feb. 11, 1957, Ser. No. 639,499
2 Claims. (Cl. 267—65)

This invention relates to pneumatic bellows of the type known as air springs and more particularly to an improved air spring and air spring mounting for vehicle suspensions.

The present invention is embodied in a single convolution air spring terminating at one end in an open bead of relatively large diameter and at the other end in a smaller end portion which is capable of telescoping movement through the open bead during compression of the air spring. The small end portion is assembled with a supporting member which not only supports the air spring physically but also provides a surface which controls the deflection of the air spring convolution during the compressive stroke of the air spring in such a manner as to impart a desirable spring rate to the air spring. This is accomplished by having the supporting surface converge so that the effective area of the air spring diminishes during the initial portion of the compressive stroke in such a way that the effective area and the internal pressure at any position in this range of deflection provide the desired low rate. The supporting surface then flares outwardly causing the air spring convolution to deflect in such a way that the effective area of the air spring increases rapidly to produce an effective pneumatic "bumper" towards the end of the compressive stroke.

A general object of the invention, therefore, is to provide an air spring construction and supporting means therefor which provides an effective control of the spring rate of the air spring. Another object is to provide an air spring construction which requires a minimum of reservoir volume. A more specific object is to provide a supporting surface for an air spring which during the compressive stroke provides the desired stability of operation. Yet another object is to provide an air spring assembly which is cheap and easy to produce and which may be readily and conveniently assembled in a vehicle suspension.

These and further objects and advantages will be more fully apparent from the following description of a preferred form of the invention, reference being had to the accompanying drawings in which:

FIGURE 8 is a graphical representation illustrating the properties of an air spring and pedestal member suspension embodying the present invention, Graph A showing the manner in which dynamic load varies throughout the working stroke of the air spring and Graphs B and C showing how the spring rate and effective area also vary throughout the working stroke.

The air spring assembly of the invention will be described in connection with the rear wheel suspension of an automobile but it will be apparent that it can be used to advantage in the suspensions of other vehicles including trucks, busses and railroad cars, and in front wheel as well as rear wheel suspensions.

Figure 1:
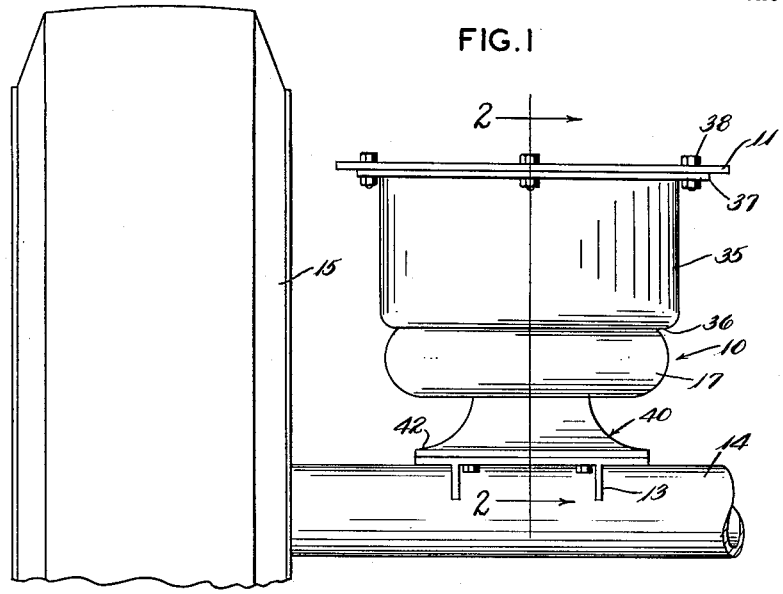
FIGURE 1 is a fragmentary front elevation of an automobile suspension having an air spring and supporting member embodying the present invention.
Figure 2:
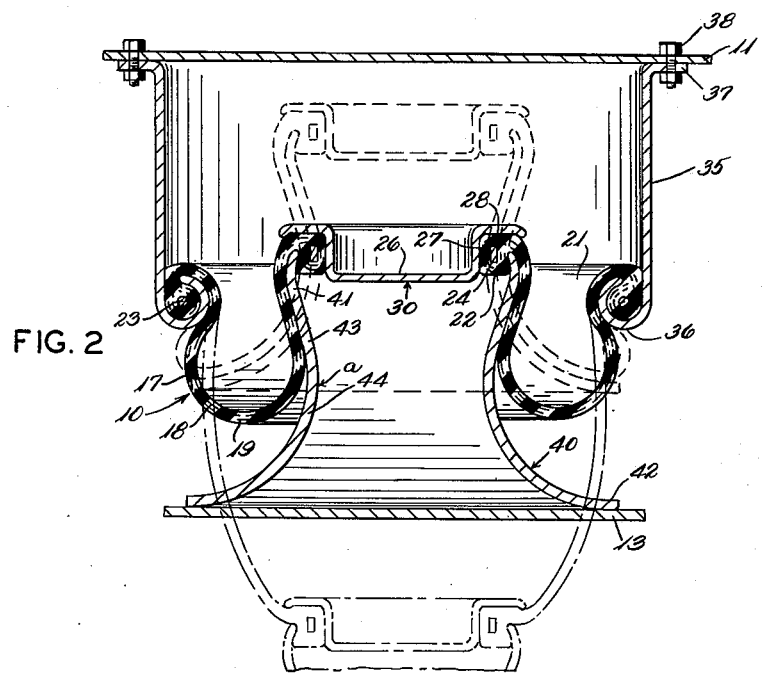
FIGURE 2 is a view taken in the vertical central plane of the air spring of FIGURE 1 and showing, on an enlarged scale, the details of the air spring and its supporting structure, the design or mid-position of the air spring being shown in solid lines and the fully compressed and extended positions being indicated in broken lines.
Figure 3:
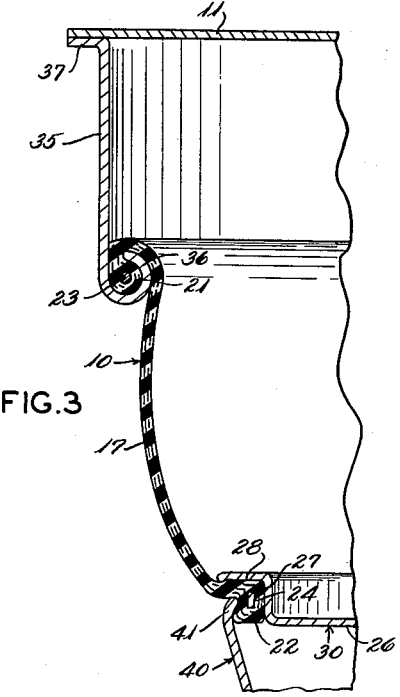
FIGURES 3–7 are somewhat diagrammatic, fragmentary views of the vehicle suspension of FIGURES 1 and 2 showing successive positions which the air spring takes during its compressive stroke, beginning with the fully extended position as in FIG. 3 and ending with the fully compressed position of FIGURE 7.
Figure 4:
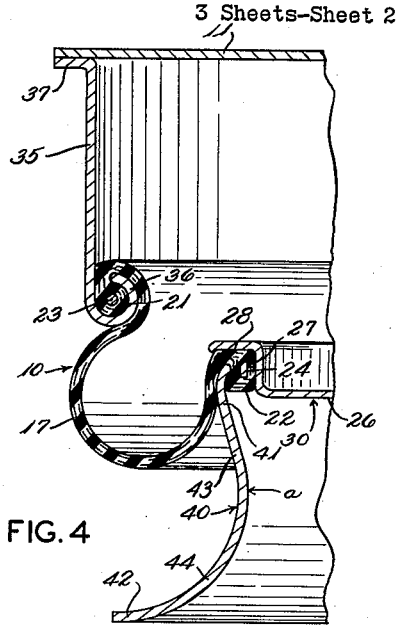
Figure 5:
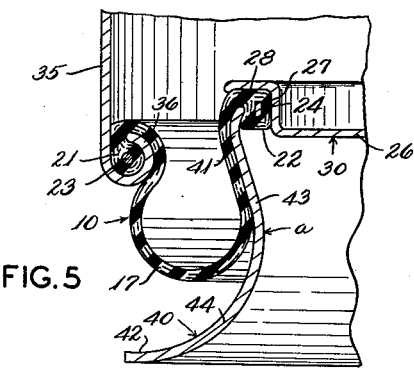

As shown in FIGURE 1, such an air spring 10 is secured to and mounted between a suitable frame member 11 of the automobile and a bracket 13 which is mounted on the rear axle housing 14 and which moves vertically with the rear wheel 15 during the operation of the automobile. When the wheel 15 encounters a bump in the road, its movement will cause the axle to move upward toward the frame of the automobile compressing the air spring 10 and increasing the pressure of the air in the air spring. As will be seen later, it is the variation in the effective area of the air spring as it deflects in response to wheel movement, together with the change in air pressure, which controls the spring rate thereby providing the desired cushioning of the wheel movement which gives the automobile a comfortable ride.

The air spring 10 in the present example has a single convolution body 17 of two plies, 18 and 19, essentially weftless rubberized fabric, the plies having cords which preferably extend at an angle of about 15°–18° when the plies are built into the air spring with the cords of the plies crossing each other at an angle. The interior of the air spring has a lining of rubber, preferably neoprene because of its oil resistant characteristics, to help retain air within the air spring. In its fully extended position, the air spring has a cord length of about 5 inches to 7½ inches from bead to bead. The ends of the plies are wrapped about and anchored to metal rings 23 and 24 to form the terminal beads 21 and 22. In the present example, the top bead 21 which is fixedly secured relative the frame 11 of the automobile has an external diameter of about 6 inches and an internal diameter of about 5 inches. The bottom bead 22 which moves with the wheel 15 has an external diameter of about 3 inches, and is closed off by a flanged cup member 26 which is drawn from sheet steel and which is cemented and vulcanized at its surfaces 27 and 28 to the bead 22. Hereafter, the bead 22 and cup 26 will be referred to as the closed end portion, generally designated at 30, of the air spring. The closed end 30 is small enough to move freely through the open bead 21 in a telescoping movement when the air spring is compressed.

The air spring is connected to the frame 11 of the automobile by a deep drawn reservoir member 35 whose lower edge 36 is crimped tightly about the upper bead 21 to hold the bead securely and to provide an airtight seal at this connection. The reservoir member 35 terminates in an outer flange 37 which is secured to the frame of the automobile in any suitable manner, as by bolts 38. Suitable means, not shown, are provided to seal the joint between the reservoir member and the body of the automobile. The member 35 provides space for the telescoping movement of the lower bead 22 as the air spring is compressed and also acts as a reservoir in free communication with the interior of the air spring. For the air spring of the present example, the reservoir should preferably have a volume of 50 (or less) cubic inches. The total volume of bellows plus reservoir is approximately 100 cubic inches.

The air spring is supported by and secured to the bracket 13 by a supporting pedestal member 40, having a curved upper edge 41 which fits snugly against the lower bead 22 and clamps it tightly against the surface 27 of the cup 26 and having a lower terminal flange 42 which is secured by any suitable means to the bracket 13.

The construction is such that the edge 41 snaps into assembly with the air spring facilitating the assembly of the air spring in the automobile suspension.

Figure 6:
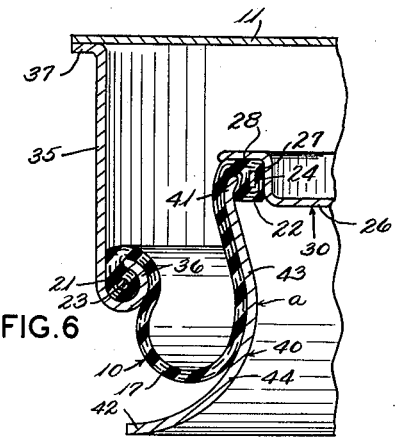
Figure 7:
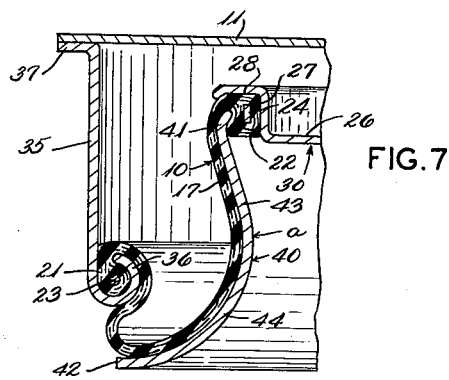

From adjacent the bead 22, the member 40 has a portion 43 which converges inwardly permitting the convolution of the air spring to roll inwardly during a definite portion of the compressive stroke, see FIGURE 6. The angle of convergence is about 17° to 19° to the axis of the air spring, but the angle may and usually will vary for different air spring and service conditions. This converging portion 43, by providing room for the air spring convolution to move into, enables the effective area of the air spring to become smaller when it compresses in response to shocks of relatively small amplitude, see FIGURE 8, graph C, and thus it results in a minimum spring rate at the design position and a correspondingly soft ride.

The portion 43 at the bead 22 has a diameter of about 2¾ inches and extends to a point indicated at "$a$," in FIGURES 3–7; where it has a minimum diameter of about 2 inches. The air spring will contact the member 40 at point "$a$" (see FIGURE 6) when it has deflected from design position about 1¾ inches and at this point its effective area is about at a minimum, see also FIGURE 8.

For deflections beyond point "$a$," it is desirable to increase the effective area so as to increase the spring rate and produce a bumper action at the end of the compressive stroke of the air spring. This increase in area is provided by a diverging portion 44 which begins at point "$a$" and which flares outwardly to force the air spring outwardly as the convolution rolls upon this portion. The portion 44 thus increases the effective area and causes the air spring to have an increasingly higher spring rate for large deflections of the air spring, see FIGURE 7, and causes road shocks of relatively great amplitude to be effectively absorbed by the air spring before "bottoming" occurs. Under almost all normal operating conditions, this combination of air spring and supporting member will usually prevent any bottoming from occurring.

The performance characteristics of a single convolution air spring when used in conjunction with a pedestal of "hour-glass" shape, such as that described above, are compared graphically in FIGURE 8 with the characteristics of the same air spring when used with a conventional straight-sided or cylindrical pedestal. The characteristics of the hour-glass combination are shown in solid lines while those of the cylindrical arrangement is shown in dotted lines. FIGURE 8 has 3 graphs, graph A showing the relationship between dynamic load, in pounds, plotted against the vertical displacement i.e. The deflection of the spring in inches; graph B plotting the spring rate, in pounds per inch against vertical displacement; and, graph C plotting the effective area of the air spring, in square inches, against vertical displacement.

Referring first to graph A, it will be seen that the effect of the hour-glass pedestal is to flatten out slightly the dynamic load curves in the region of the design position, and to eliminate the "shelf" which is shown at the right-hand portion of the cylindrical pedestal curve. The difference between the dynamic load curves for the two arrangements is significant in two respects. First, it will be seen that the hour-glass pedestal produces a frequency of about 48 cycles per minute as compared with a frequency of about 54 cycles per minute for the cylindrical pedestal. In this frequency range, a difference of 6 cycles produces a significantly better ride.

The difference between the two arrangements and the advantage of the hour-glass pedestal is more clearly brought out in graph B where the spring rate is plotted over the full range of deflection of the air spring. It will be seen that the hour-glass pedestal provides a minimum, and a desirably low, rate at the design position, which is the position that the air spring usually takes in an automobile suspension. The air spring with an hour-glass support will accordingly provide a soft ride at design position and at deflections up to approximately 1 to 2 inches on each side of design position. At the same time the rate increases rapidly enough in the region of full compression to provide a desirable bumper effect to prevent bottoming of the air spring.

In contrast, the curve in graph B for a cylindrical support shows the minimum rate to occur at a point remote from design position, a characteristic which is undesirable because the air spring which operates the greater part of the time at design position will not be utilizing its lowest rate. Moreover, in this particular instance, the minimum rate is displaced so far from the design position that it occurs in the region where a bumper effect is desirable; and, in addition, the minimum rate is so low as to make the air spring unstable in this region of deflection. Both of these effects are highly undesirable.

Finally, the effective area curves in graph C should be noted. These curves indicate the influence of an hourglass pedestal upon the effective area of the air spring and reveal why the performance characteristics shown by the curves of graphs A and B are obtained in actual service. Thus the hourglass pedestal provides a low effective area at design position and in the first deflections of the air spring in compression; it then causes the air spring to increase gradually in effective area for intermediate deflections and then rapidly in positions of extreme compression. These changes in effective area, taken in conjunction with the changing air pressure within the air spring, result in the desirable performance characteristics of the air spring, hour-glass pedestal arrangement.

I claim:

1. An air spring suspension for a vehicle, comprising a vehicle frame, a vehicle wheel, means supporting said wheel with respect to said frame, an air spring mounted between said frame and said support means and including an upper open portion, means securing said upper open portion of said air spring to said frame, said air spring having a radially outwardly unrestricted, freely radially outwardly bulging, convex convolution terminating in an annular bead adapted to telescope with relation to said open portion, and a single support member for said convolution securing said bead to said support means and forming a rigid pedestal extending from said bead and adapted to engage said convolution progressively during the compressive stroke of said air spring, the surface of said pedestal converging radially inwardly from said bead to a neck portion having a diameter smaller than that of said bead, to decrease the effective area of said air spring during a portion of said compressive stroke, said surface thereafter flaring outwardly from said neck portion, to increase the effective area of said air spring.

2. An air spring suspension for a vehicle as in claim 1, in which said surface of said pedestal converges inwardly at an angle decreasing from about 17° to 19° to the axis of said air spring to 0°.

References Cited in the file of this patent

UNITED STATES PATENTS

| | | |
|---|---|---|
| 971,583 | Bell | Oct. 4, 1910 |
| 1,242,431 | Foster | Oct. 9, 1917 |
| 1,475,049 | Church | Nov. 20, 1923 |
| 1,729,565 | Caretta | Sept. 24, 1929 |
| 2,725,078 | Glancy | Nov. 29, 1955 |
| 2,846,983 | Otto | Aug. 12, 1958 |
| 2,901,242 | Elliott et al. | Aug. 25, 1959 |
| 2,950,104 | Bowser et al. | Aug. 23, 1960 |